(12) United States Patent
Wegner

(10) Patent No.: US 12,682,921 B2
(45) Date of Patent: Jul. 14, 2026

(54) COIN OR MEDAL WITH EMBOSSED SOUNDTRACK

(71) Applicant: FIRMA, Karlsfeld (DE)

(72) Inventor: Alex Wegner, Munich (DE)

(73) Assignee: FIRMA, Karlsfeld (DE)

( * ) Notice: Subject to any disclaimer, the term of this patent is extended or adjusted under 35 U.S.C. 154(b) by 0 days.

(21) Appl. No.: 18/938,416

(22) Filed: Nov. 6, 2024

(65) Prior Publication Data

US 2025/0061918 A1 Feb. 20, 2025

Related U.S. Application Data

(62) Division of application No. 17/117,811, filed on Dec. 10, 2020, now abandoned.

(30) Foreign Application Priority Data

Dec. 10, 2019 (DE) ..................... 10 2019 133 806.9

(51) Int. Cl.
| | |
|---|---|
| *G11B 3/68* | (2006.01) |
| *A44C 3/00* | (2006.01) |
| *A44C 21/00* | (2006.01) |
| *B44B 5/00* | (2006.01) |
| *B29L 17/00* | (2006.01) |
| *B44B 5/02* | (2006.01) |

(52) U.S. Cl.
CPC ................ *G11B 3/68* (2013.01); *A44C 3/004* (2013.01); *A44C 21/00* (2013.01); *B44B 5/009* (2013.01); *A44C 3/005* (2013.01); *B29L 2017/003* (2013.01); *B44B 5/0071* (2013.01);

*B44B 5/024* (2013.01); *G11B 3/682* (2013.01); *G11B 2220/20* (2013.01)

(58) Field of Classification Search
None
See application file for complete search history.

(56) References Cited

U.S. PATENT DOCUMENTS

| | | | | |
|---|---|---|---|---|
| 1,299,153 A | * | 4/1919 | Emerson .................. | G11B 3/70 369/166 |
| 1,356,815 A | | 10/1920 | Robert | |
| 1,434,190 A | * | 10/1922 | Bird ........................ | B21J 5/022 72/376 |
| 1,479,794 A | | 1/1924 | Emerson | |
| 1,479,847 A | | 1/1924 | Widmann | |

(Continued)

FOREIGN PATENT DOCUMENTS

| | | |
|---|---|---|
| CN | 1065426 A | 10/1992 |
| CN | 1547198 A | 11/2004 |

(Continued)

OTHER PUBLICATIONS

"1 Dollar ANTON 10 VIVALDI Playable CD Proof Silver Coin 1 $ Fiji 2018," (2018) (Year: 2018).

(Continued)

*Primary Examiner* — William J Klimowicz
(74) *Attorney, Agent, or Firm* — NIXON & VANDERHYE

(57) ABSTRACT

In order to create a long-lasting memento for a musical performance for example, which also has a practical use, a coin or medal is designed with an embossed soundtrack. Furthermore, a method for embossing this coin or medal is proposed.

12 Claims, 4 Drawing Sheets

(56) References Cited

U.S. PATENT DOCUMENTS

| | | | | |
|---|---|---|---|---|
| 2,020,381 | A | 11/1935 | Labowitz | |
| 2,314,417 | A * | 3/1943 | Neal | A47G 1/0616 |
| | | | | 40/340 |
| 2,352,285 | A * | 6/1944 | Proctor | B29D 17/00 |
| | | | | 156/332 |
| 2,505,787 | A | 5/1950 | Muky | |
| 2,528,610 | A * | 11/1950 | Saffady | B29C 43/02 |
| | | | | 369/288 |
| 2,528,611 | A * | 11/1950 | Saffady | B29C 43/02 |
| | | | | 283/117 |
| 2,588,958 | A | 3/1952 | Joseph | |
| 2,714,448 | A | 8/1955 | Brown | |
| 3,000,640 | A | 9/1961 | Strauss | |
| 3,039,218 | A * | 6/1962 | Rogers | G11B 3/70 |
| | | | | 40/340 |
| 3,245,691 | A | 4/1966 | Harry | |
| 3,312,475 | A | 4/1967 | Mladen | |
| 3,321,208 | A | 5/1967 | Coyle | |
| 3,463,303 | A | 8/1969 | Gorman | |
| 4,511,033 | A | 4/1985 | May | |
| 5,090,561 | A | 2/1992 | Spector | |
| 5,740,155 | A | 4/1998 | Spector | |
| 6,616,983 | B1 * | 9/2003 | McCauley | B44C 1/005 |
| | | | | 427/508 |
| 7,055,740 | B1 | 6/2006 | Schultz | |
| 7,188,350 | B2 | 3/2007 | Rosowski | |
| 10,792,206 | B2 | 10/2020 | Soytürk | |
| 2004/0050724 | A1 | 3/2004 | Grul | |
| 2005/0002319 | A1 | 1/2005 | Fadeyev | |
| 2016/0322069 | A1 | 11/2016 | Wei et al. | |
| 2020/0098028 | A1 | 3/2020 | Deluca | |

FOREIGN PATENT DOCUMENTS

| | | | |
|---|---|---|---|
| CN | 2932555 | Y | 8/2007 |
| CN | 105185387 | A | 12/2015 |
| CN | 206833560 | U | 1/2018 |
| CN | 207186149 | U | 4/2018 |
| DE | 9311685 | U1 | 9/1993 |
| DE | 19818710 | A1 | 10/1999 |
| DE | 60102007 | T2 | 3/2004 |
| DE | 102004005825 | A1 | 8/2005 |
| DE | 102004033356 | A1 | 8/2005 |
| DE | 202008003639 | U1 | 6/2008 |
| DE | 202019106873 | U1 | 1/2020 |
| DE | 102020101908 | A1 | 7/2021 |
| EP | 3834653 | A1 | 6/2021 |
| GB | 1311782 | A | 3/1973 |
| JP | S5077972 | A | 6/1975 |
| JP | S5094901 | A | 7/1975 |
| JP | S53121803 | U | 9/1978 |
| JP | S5833604 | B2 | 7/1983 |
| JP | H03016720 | A | 1/1991 |
| JP | 3142068 | U | 6/2008 |
| KR | 20190072110 | A | 6/2019 |
| NL | 7506541 | A | 12/1975 |
| WO | 9853719 | A2 | 12/1998 |
| WO | 0170516 | A2 | 9/2001 |
| WO | 2005073943 | A1 | 8/2005 |
| WO | 2017027832 | A1 | 2/2017 |
| WO | 2019101976 | A1 | 5/2019 |
| WO | 2020038733 | A1 | 2/2020 |

OTHER PUBLICATIONS

"Voyager Golden Records 40 Years Later: Real Audience Was Always Here on Earth," Jason Wright, Scientific American, Aug. 14, 2017, https://www.scientificamerican.com/article/voyager-golden-records-40-years-later-real-audience-was-always-here-on-earth/ (Year: 2017).

Office Action, issued in Chinese Patent Application No. 202011450816.6 dated Mar. 4, 2025.

Office Action, issued in Japanese Patent Application No. 2020-201995dated Mar. 6, 2024.

* cited by examiner

COIN OR MEDAL WITH EMBOSSED SOUNDTRACK

CROSS REFERENCE TO RELATED APPLICATIONS

This application is a Divisional of application Ser. No. 17/117,811, filed on Dec. 10, 2020, which claims priority under 35 U.S.C. § 119 (a) to Application No. 10 2019 133 806.9, filed in Germany on Dec. 10, 2019, all of which are hereby expressly incorporated by reference into the present application.

BACKGROUND OF THE INVENTION

Field of the Invention

The invention relates to a coin or medal and to an embossing method.

Description of the Related Art

It has always been the case that coins and medals have been used not only as a means of payment but also to immortalise kings and emperors. The use of coins or medals as gift items to communicate information is known from DE 10 2004 033 356 A1. In that case a storage medium (for example a USB stick) is used which is incorporated into the interior of the coin or medal. The surface of the coin or medal serves in that instance for decorative purposes.

The embossing of motifs, which are formed only from arranged rows of depressions, on coins or medals and the associated embossing stamp are known from DE 601 02 007 T2. In that case, the colour shading of embossed images is generated by means of the distance between rows of impressions positioned very close together. The depth of colour can be adapted by the depth of the rows. These very closely positioned rows of depressions are engraved by means of laser technology.

Sound media for music and sound recordings are generally extensively known. Now, if these soundtracks are placed onto specific media materials, diverse application possibilities arise such as for example the miniature record made from chocolate described in DE 20 2008 003 639 U1. This is designed in such a way that it can be played by means of a commercially available record player.

Chocolate is a highly perishable material which also does not have a high level of temperature stability. Now, if it is desired to use a miniature record for example as a memento, it is necessary to use more stable materials.

SUMMARY OF THE INVENTION

Therefore, the object of the invention is to provide a coin or medal which forms a long-lasting memento for example for a musical performance, which also has a practical use.

In accordance with the invention, this object is achieved by the claims. Advantageous developments are apparent from the dependent claims.

This is achieved in that a coin or medal is provided which is designed in such a way that a soundtrack is applied to the surface by means of a suitable embossing method. This soundtrack should preferably be playable by means of a commercially available record player or a playback device developed for the coin or medal.

The use of a coin is particularly favourable since a widely used symbolism is inherent therein which is known to practically everyone. Coins are the most widely used means of payment and are often also used as lucky charms.

One advantage of the solution according to the invention is the longevity of metal coin or medal which can be a memento which is usable for many years, exhibits hardly any visible changes over time, is scratch-resistant and easy to transport.

The soundtrack in accordance with the invention, which is embossed into the surface of the coin or medal, is still playable even after years and does not undergo any temperature-induced changes provided it is subject to normal outdoor temperatures and there is no intention to heat it to the melting point of the metal used.

A further advantage of the coin or medal with an embossed soundtrack in accordance with the invention is that the coin or medal consists of solid metal, in particular of a noble metal. Such a metal is tough and also aesthetically appealing. Most preferred are the following metals: gold (Au), silver (Ag), platinum (Pt), palladium (Pd), copper (Cu) and nickel (Ni) as well as gilded or silvered metal blanks. Plated blanks can also be used in the method in accordance with the invention.

A further advantage of the coin or medal with an embossed soundtrack in accordance with the invention is that, despite the smallness of the coin or medal, the information content is at least comparable with what can be held on the surface of a single record. This is because the use of metals ensures a high level of stability for the soundtrack and this can therefore be embossed more densely, i.e. the distance between the individual sound grooves can be selected to be smaller than in the case of a conventional record. The density of the soundtrack and the resulting information density mean that furthermore a slow rotation speed of in particular 33 rpm of a conventional record player or an even slower speed of a player device made specifically for the coin or medal can be selected.

The use of a soundtrack on the coin or medal, the groove of which is embossed in a V-shape into the surface of the coin or medal, is particularly favourable, and this "V" has in particular an angle of inclination to the horizontal, i.e. to the surface of the coin or medal, of 45°, which permits the storage of information of a stereo recording.

In an advantageous development, provision is made that, before embossing of the soundtrack, the coin or medal is first processed in such a way that it has the most planar and smooth surface possible. For this purpose, the coin or medal is placed as a blank (round blank) in a pressing chamber which is formed from the embossing ring with mutually opposing, mounted first and second embossing stamps. The embossing ring and the two embossing stamps consist of a highly pressure-resistant material.

In the embossing step, embossing is preferably carried out at very high pressure (about 200 tons to 800 tons).

In one advantageous embodiment, the first and second embossing stamps have a very smooth surface in the direction of the embossing chamber. On at least one of the embossing stamps are located dies which is/are placed into the pressing chamber between the blank and the first and/or second embossing stamp. This permits simultaneous embossing of the corresponding soundtrack and/or of the motif on the side of the coin or medal opposite the soundtrack, this side having at the same time a very smooth surface, the so-called mirror finish. It would also be possible to emboss a soundtrack with a motif on one side of the coin or medal and a further motif on the side of the coin or medal opposite the soundtrack.

In a further advantageous embodiment, the first and second embossing stamps again have a very smooth surface in the direction of the embossing chamber. A die which shows the negative of the desired motif is located on one of the two embossing stamps. This permits the embossing of the motif with a very smooth surface, the so-called mirror finish. In a second embossing step, by means of a further die, the soundtrack is then embossed, possibly with a further motif on the side of the coin or medal opposite the motif.

In a further advantageous embodiment, the first and second embossing stamps have a very smooth surface in the direction of the embossing chamber. In this case, in order to achieve optimal compacting and the smoothing out of any unevenness on the surface (mirror finish) of the blank a die is again not used. In the second embossing step, by means of at least one die which is/are placed into the pressing chamber between the blank and the first and/or second embossing stamp, the corresponding soundtrack and/or the motif is embossed on the side of the coin or medal opposite the soundtrack.

It is also possible for the die not to have the diameter of the round blank but to be smaller than it. This permits the embossing of structures-such as the soundtrack- or motifs which do not extend over the entire surface of the coin or medal.

The use of an embossing chamber in which there is a very small gap, in particular a gap of about 0.02 mm, between the embossing stamp and embossing ring is particularly favourable. This ensures that as little material as possible is lost.

In an advantageous development of the solution in accordance with the invention, the use in particular of a galvanically produced die is provided for.

For this purpose, a metal plate is first provided with a synthetic material layer of in particular nitrocellulose lacquer. As in the case of a record, the soundtrack of the die is introduced into this synthetic material layer by means of a stylus.

This layer is then galvanically provided with a layer of silver electrolyte, in particular 4-5 μm thick.

A very thin separating agent is applied to the silver electrolyte layer.

A nickel layer, in particular about 250 μm thick, is galvanically applied to this layer, it is then detached and serves as a die.

It is particularly favourable if the coin or medal is provided with a central hole in the centre before or after the two embossing processes in order to permit it to be played on a commercially available record player.

A further advantage of the solution in accordance with the invention is that the coin embossed in this way can be used on a commercially available record player with the automatic shut-off deactivated.

BRIEF DESCRIPTION OF THE DRAWINGS

Further advantages, details and features will be apparent from the following description of several exemplified embodiments of the invention with reference to the drawing.

In the drawings.

DESCRIPTION OF THE PREFERRED EMBODIMENTS

Figure 1:
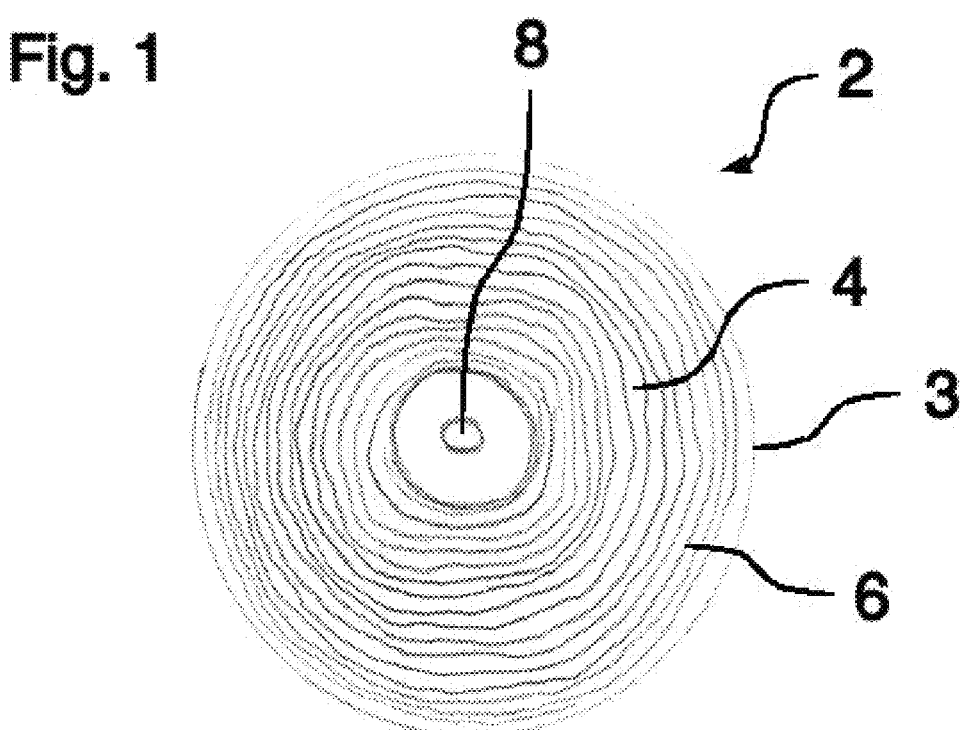
FIG. 1 is a schematic illustration of the top view of a first embodiment of a coin or medal in accordance with the invention with an integrated soundtrack.

FIG. 1 shows a top view of a coin or medal 2 in accordance with the invention with a circumferential outer edge 3. A coin or medal in accordance with the invention has a diameter of about 50 mm to 150 mm, in particular about 100 mm. A spiral-shaped soundtrack 6 is embossed on the surface 4 of the coin or metal 2. As in the case of a commercially available record, the soundtrack 6 consists of a continuous uninterrupted groove which extends at a small distance from the outer edge of the coin or medal 2 to the free surface in the middle thereof. This free surface in the middle of the coin or medal 2 in which there is no soundtrack 6 is necessary since this region, by reason of the design of a commercially available record player 12, cannot be played and has a diameter of approximately 20 mm to 50 mm in the case of a coin and 50 to 100 mm in the case of a medal. However, if a dedicated playing device for the coin or medal 2 is made, it would be possible to make it in such a way that this free surface can be avoided and the soundtrack 6 can extend as far as the centre of the coin or medal 2. A central hole 8 is provided in the centre of the coin or medal in order to render it playable using a commercially available record player. If, again, a dedicated playing device for the coin or medal 2 is chosen, it would be possible to replace this central hole 8 by a depression or even to avoid it altogether by a fixing arrangement using the turntable 20.

Figure 2:
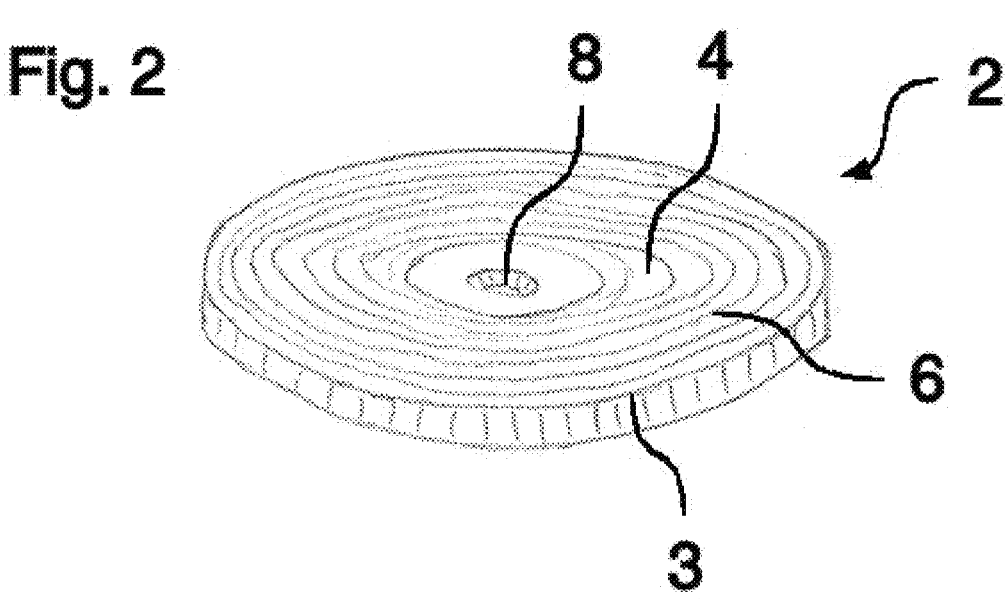
FIG. 2 is a perspective illustration of a coin or medal in accordance with the invention with an integrated soundtrack in the embodiment according to FIG. 1.

FIG. 2 shows a perspective side view of a coin or medal 2 in accordance with the invention with a circumferential outer edge 3. Again, the soundtrack 6 and the central hole 8 are shown.

Figures 3, 4:
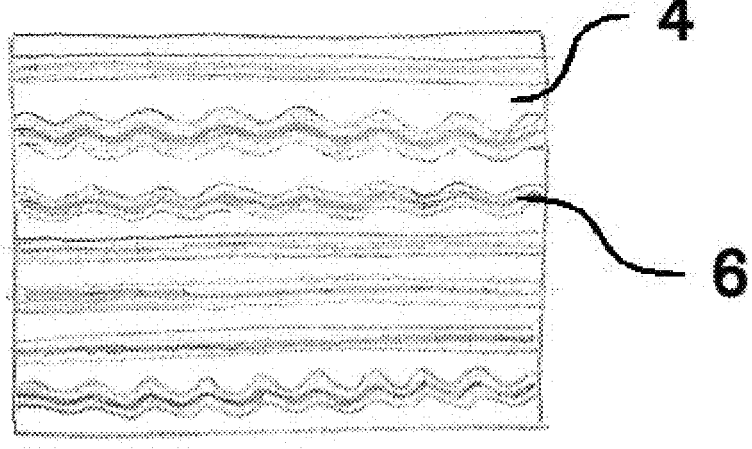
FIG. 3 is a perspective illustration of a further embodiment of a coin or medal in accordance with the invention showing an example of a motif which is embossed on the side of the coin or medal opposite the soundtrack.
FIG. 4 is a schematic illustration in detail of a part of the soundtrack embossed on the coin or medal.

FIG. 3 shows another perspective side view of a coin or medal 2 in accordance with the invention with a circumferential outer edge 3. In this illustration, the central hole 8 is again shown but now from the rear side (the side of the coin or medal 2 opposite the soundtrack). Furthermore, an example of a motif or relief 10 can be seen which can be embossed on this side of the coin.

FIG. 4 is a schematic illustration in detail of a section of the soundtrack 6 embossed on the coin or medal. In accordance with the invention, the surface 4 of the coin consists of a material which is tough and also aesthetically appealing. For this purpose the following are proposed, inter alia, especially the non-ferrous and noble metals: gold (Au), silver (Ag), platinum (Pt), palladium (Pd), copper (Cu) and nickel (Ni) as well as gilded or silvered metal blanks, but also steel. Furthermore, FIG. 4 shows that the soundtrack 6 can extend straight or in an undulating manner. The way the "lateral" deflection of the soundtrack 6 extends corresponds to the acoustic oscillation of the stored signal and can be converted into an acoustic signal by means of the tip of a reproducing stylus 14 of a sound pick-up 16 illustrated in FIG. 5 and FIG. 6.

Figure 5:
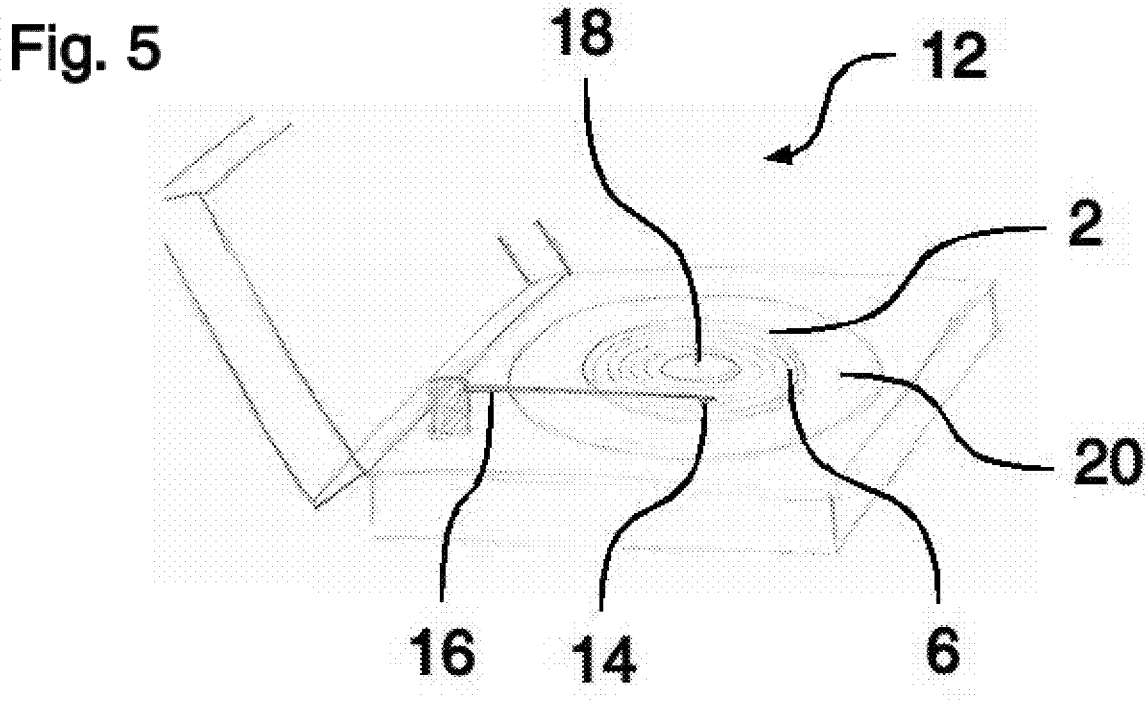
FIG. 5 is a perspective illustration of a coin or medal in accordance with the invention with an integrated soundtrack as placed by way of example in a commercially available record player shown in sketch form.

FIG. 5 shows a schematic perspective view of the coin or medal 2 with an integrated soundtrack 6 in accordance with the invention as placed by way of example on the turntable 20 of a commercially available record player 12 shown in sketch form. The centre spindle 18 of the record player 12 therefore centres the medal or coin 2 on the turntable 20 by passing through the central hole 18. The soundtrack 6 can be converted into an acoustic signal with the aid of the tip of a reproducing stylus 14 of the sound pick-up 16.

Figure 6:
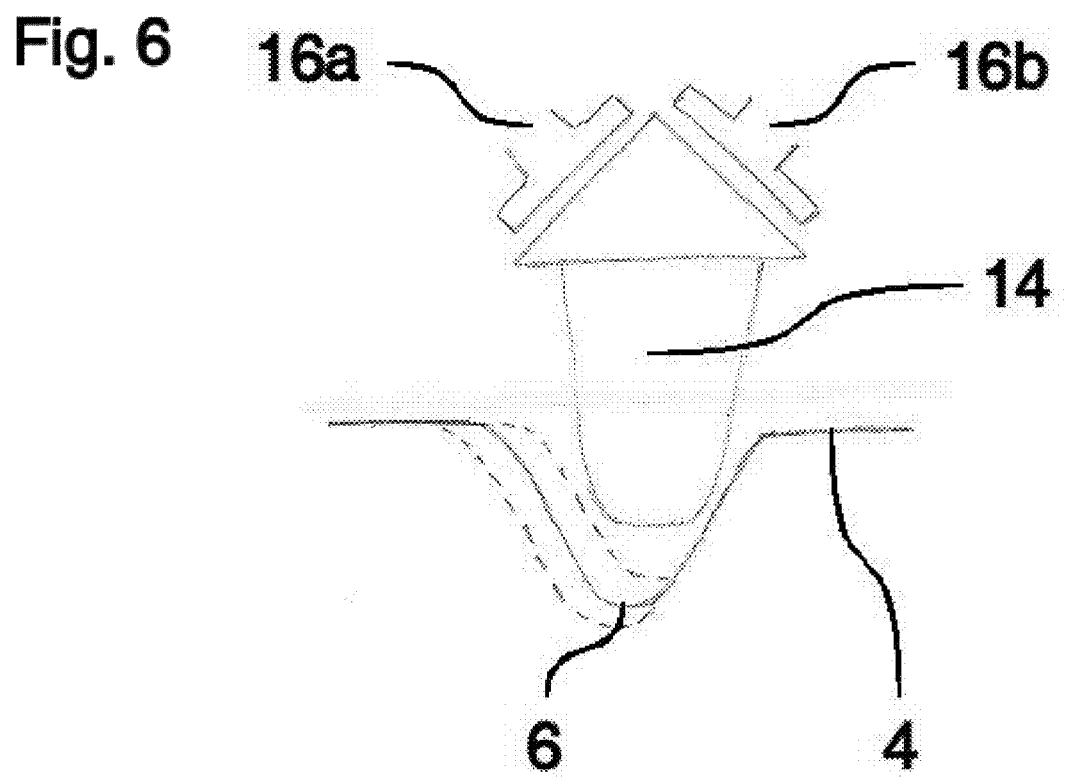
FIG. 6 is a schematic illustration of the side view of the soundtrack embossed on the coin or medal in accordance with the invention and a schematic illustration of the point of a reproducing stylus of a sound pick-up used to pick up the soundtrack.

FIG. 6 shows a schematic illustration of the side view of the soundtrack 6 embossed on the coin or medal 2 and a schematic illustration of the reproducing stylus 14 with the associated left 16a and right 16b coil of the sound pick-up 16. The depth of the soundtrack 6 can be used to permit an additional depth movement in addition to the sideways movement. It is therefore possible to reproduce the piece embossed in the soundtrack in stereo, wherein one channel is characterised by the vertical movement, the second by the horizontal movement. The groove of the soundtrack 6 is of a "V" shape, in particular with an angle of inclination of the flanks of 45° with respect to the surface 4 of the coin or medal 2.

The broken lines in FIG. 6 show examples of options for varying the depth of the soundtrack. This is shown by way of example on the left side but the right side can also be described instead of this. This makes no difference since a commercially available record player 12 has a left 16a and a right 16b coil in the sound pick-up 16.

If the depth of the soundtrack 6 is varied on both sides of the groove at the same time, the width of the soundtrack 6 therefore changes or—if the width is kept constant—the angle of inclination of the flanks necessarily changes. A change in the width of the soundtrack 6 is feasible in the case of a coin or medal 2 but is not worth attempting since it requires greater spacing of the grooves and therefore influences the information density. A change in the angle of inclination of the flanks symmetrically or even asymmetrically with respect to the centre point of the soundtrack 6 is favourable when using a dedicated playing device for the coin or medal 2 with a correspondingly adapted tip on the reproducing stylus 14 of the sound pick-up 16. However, in order to play the coin or medal 2 by means of a commercially available record player 12 it would be necessary to dispense with a change to the angle of inclination of the flanks with respect to the surface 4 since such a change impairs the playing by the tip of a commercially available reproducing stylus 14.

Figure 7:
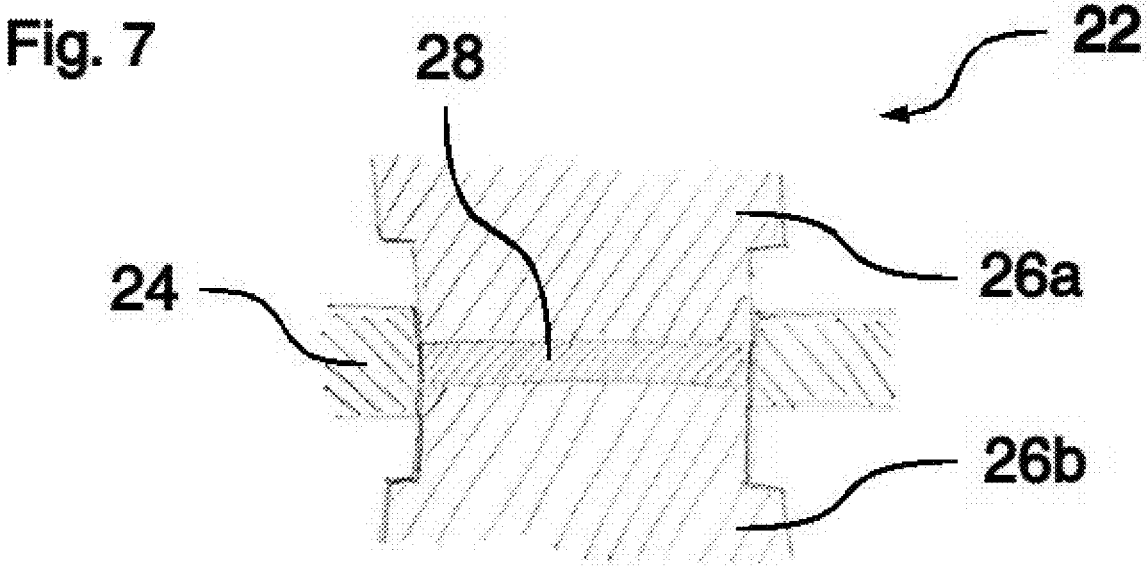
FIG. 7 is a schematic illustration of the cross-section of the embossing chamber with the embossing ring, first and second embossing stamps and the blank of the coin or medal in accordance with the invention.

FIG. 7 illustrates a cross-sectional view through the embossing chamber 22 with an embossing ring 24, first 26a and second 26b embossing stamps 26 and the blank 28 of the coin or medal 2. It is particularly favourable if a very small gap, in particular a gap of 0.02 mm, is provided in the embossing chamber 22 between the embossing stamp 26 and embossing ring 24. This ensures that as little material of the blank 28 as possible is lost. Optimally, the embossing ring 24 lies very closely against the blank 28 of the coin or medal 2 in order to avoid deformation of the blank 28 of the coin or medal 2 during the embossing process. By means of this structure and the very smooth surface of the first 26a and second 26b embossing stamps 26 it is possible to achieve optimal compaction and smoothing out of any unevenness on the surface of the blank 28.

Figure 8:
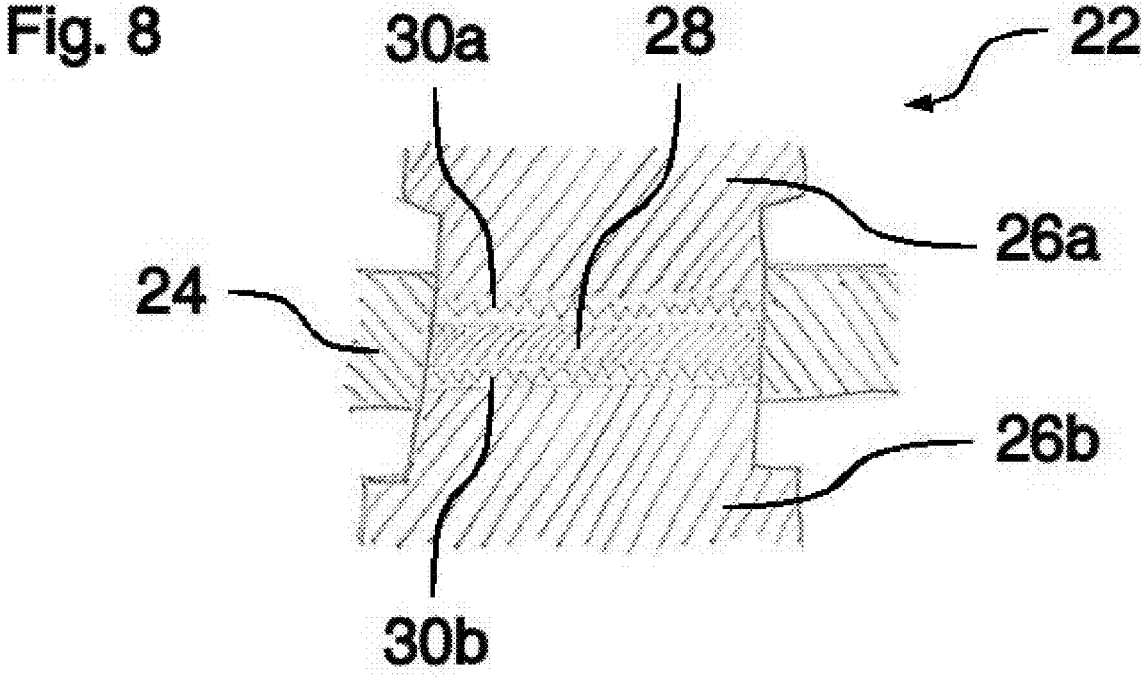
FIG. 8 is a schematic illustration of the cross-section of the embossing chamber with the embossing ring, first and second embossing stamps, blank of the coin or medal in accordance with the invention and the die used to introduce the soundtrack and/or the relief on the opposite side.

FIG. 8 shows the same cross-sectional view through the embossing chamber 22 as in FIG. 7 but in this case additionally the first 30a and second 30b dies 30, one for embossing the soundtrack 6 and one for embossing the motif or relief 10 on the side of the coin or medal 2 opposite the soundtrack 6.

The invention claimed is:

1. A two-stage embossing method for producing a coin or medal, comprising:
    during a first stage of the embossing method, introducing a coin blank into an embossing chamber that comprises an embossing ring and a first and a second embossing stamp facing each other and mounted to move towards each other so that the coin blank is embossed to compact and smooth at least one surface of the coin blank to form a planar, smooth surface, the first stage being performed without inserting a die into the embossing chamber, and
    during a second stage of the embossing method, embossing a soundtrack using a die that is inserted in the embossing chamber between the blank and the first and/or second embossing stamp to emboss the soundtrack into the planar, smooth surface of the coin blank.

2. The embossing method according to claim 1, where at least one of the first and second embossing stamp have a smooth surface towards the embossing chamber.

3. The embossing method according to claim 1, wherein the die is smaller than the coin blank.

4. The embossing method according claim 1, further comprising providing the coin or medal with a central hole.

5. The embossing method according to claim 1, further comprising producing the die galvanically.

6. The embossing method according to claim 5, wherein a metal plate is provided with a plastic layer, into which the soundtrack of the die is introduced.

7. The embossing method according to claim 6, wherein the plastic layer is provided with a further layer of silver electrolyte.

8. The embossing method according to claim 7, wherein a separating agent is applied onto the layer of silver electrolyte.

9. The embossing method according to claim 8, wherein a nickel layer is applied galvanically that is subsequently removed and serves as a die.

10. The embossing method according to claim 1, wherein the coin blank is embossed with a pressing force of more than 200 tons during the first stage of the embossing method.

11. The embossing method according to claim 1, further comprising galvanically manufacturing the die used in the second stage of the embossing method, wherein the galvanic manufacturing comprises:
    providing a metal plate with a plastic layer into which the soundtrack of the die is introduced,
    subsequently galvanically providing the plastic layer with a layer of silver electrolyte, onto which a separating agent is applied, and
    subsequently galvanically providing the separating agent with a nickel layer that is used as the die after being removed.

12. The embossing method according to claim 1, wherein the first and second embossing stamp have a smooth surface towards the embossing chamber.

* * * * *